(12) United States Patent
Freydina

(10) Patent No.: US 7,820,024 B2
(45) Date of Patent: Oct. 26, 2010

(54) ELECTRICALLY-DRIVEN SEPARATION APPARATUS

(75) Inventor: Evgeniya Freydina, Acton, MA (US)

(73) Assignee: Siemens Water Technologies Corp., Warrendale, PA (US)

( * ) Notice: Subject to any disclaimer, the term of this patent is extended or adjusted under 35 U.S.C. 154(b) by 1124 days.

(21) Appl. No.: 11/474,299

(22) Filed: Jun. 23, 2006

(65) Prior Publication Data

US 2007/0295604 A1  Dec. 27, 2007

(51) Int. Cl.
*B01D 61/48* (2006.01)
(52) U.S. Cl. .................. 204/632; 204/525; 204/533; 204/536; 204/518; 204/627; 204/524
(58) Field of Classification Search .......... 210/652, 210/702, 522, 523, 532, 746, 748; 204/523, 204/252, 282, 635, 636, 639, 524, 633, 284, 204/283, 533, 632, 627, 518, 525, 536
See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 4/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |

(Continued)

FOREIGN PATENT DOCUMENTS

AU   B-18629/92   10/1992

(Continued)

OTHER PUBLICATIONS

Dimascio et al., "Continuous Electrodeionization: Production of High-Purity Water without Regeneration Chemicals," The Electrochemical Society *Interface*, Fall 1998, pp. 26-29.

(Continued)

*Primary Examiner*—Jennifer K Michener
*Assistant Examiner*—Jennifer Dieterle
(74) *Attorney, Agent, or Firm*—Lando & Anastasi, LLP

(57) ABSTRACT

The disclosed techniques involve electrical separation systems that allow recovery of species from feedstreams, typically aqueous solutions. The disclosed techniques can also provide electrical separation systems having reduced tendency to form scale especially when water is being purified to reduce the concentration of hardness-causing species.

13 Claims, 2 Drawing Sheets

U.S. PATENT DOCUMENTS

| | | |
|---|---|---|
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,234,440 A | 11/1980 | Hirozawa et al. |
| 4,241,016 A | 12/1980 | Hirozawa et al. |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,550,011 A | 10/1985 | McCollum |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 4,990,260 A | 2/1991 | Pisani |
| 5,024,766 A | 6/1991 | Mahmiud |
| 5,026,465 A | 6/1991 | Katz et al. |
| 5,030,672 A | 7/1991 | Hann et al. |
| 5,032,218 A | 7/1991 | Dobson |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,118,422 A | 6/1992 | Cooper et al. |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| 5,240,579 A | 8/1993 | Kedem |
| 5,254,227 A | 10/1993 | Cawlfield et al. |
| 5,256,307 A | 10/1993 | Bachhofer et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,397,445 A | 3/1995 | Umemura et al. |
| 5,411,641 A | 5/1995 | Trainham, III et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,443,991 A | 8/1995 | Godec et al. |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,635,071 A | 6/1997 | Al-Samadi |
| 5,670,053 A | 9/1997 | Collentro et al. |
| 5,679,228 A | 10/1997 | Elyanow et al. |
| 5,679,229 A | 10/1997 | Goldstein et al. |
| 5,683,654 A | 11/1997 | Dallmier et al. |
| 5,714,521 A | 2/1998 | Kedem et al. |
| RE35,741 E | 3/1998 | Oren et al. |
| 5,736,023 A * | 4/1998 | Gallagher et al. ........... 204/524 |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,858,249 A | 1/1999 | Higby |

| | | | |
|---|---|---|---|
| 5,868,915 A | 2/1999 | Ganzi et al. | |
| 5,891,328 A | 4/1999 | Goldstein | |
| 5,925,240 A | 7/1999 | Wilkins et al. | |
| 5,928,807 A | 7/1999 | Elias | |
| 5,954,935 A | 9/1999 | Neumeister et al. | |
| 5,961,805 A | 10/1999 | Terada et al. | |
| 5,972,196 A | 10/1999 | Murphy et al. | |
| 5,980,716 A | 11/1999 | Horinouchi et al. | |
| 6,056,878 A | 5/2000 | Tessier et al. | |
| 6,099,716 A | 8/2000 | Molter et al. | |
| 6,126,805 A | 10/2000 | Batchelder et al. | |
| 6,149,788 A | 11/2000 | Tessier et al. | |
| 6,171,374 B1 | 1/2001 | Barton et al. | |
| 6,187,162 B1 | 2/2001 | Mir et al. | |
| 6,190,528 B1 | 2/2001 | Li et al. | |
| 6,190,558 B1 | 2/2001 | Robbins | |
| 6,193,869 B1 | 2/2001 | Towe et al. | |
| 6,197,174 B1 | 3/2001 | Barber et al. | |
| 6,214,204 B1 | 4/2001 | Gadkaree et al. | |
| 6,228,240 B1 | 5/2001 | Terada et al. | |
| 6,235,166 B1 | 5/2001 | Towe et al. | |
| 6,248,226 B1 | 6/2001 | Shinmei et al. | |
| 6,254,741 B1 | 7/2001 | Stuart et al. | |
| 6,258,278 B1 | 7/2001 | Tonelli et al. | |
| 6,267,891 B1 | 7/2001 | Tonelli et al. | |
| 6,274,019 B1 | 8/2001 | Kuwata | |
| 6,284,124 B1 | 9/2001 | DiMascio et al. | |
| 6,284,399 B1 | 9/2001 | Oko et al. | |
| 6,296,751 B1 | 10/2001 | Mir et al. | |
| 6,303,037 B1 | 10/2001 | Tamura et al. | |
| 6,344,122 B1 | 2/2002 | Deguchi et al. | |
| 6,365,023 B1 | 4/2002 | De Los Reyes et al. | |
| 6,391,178 B1 | 5/2002 | Garcia et al. | |
| 6,402,916 B1 | 6/2002 | Sampson et al. | |
| 6,402,917 B1 | 6/2002 | Emery et al. | |
| 6,461,519 B1 | 10/2002 | Weltzer | |
| 6,482,304 B1 | 11/2002 | Emery et al. | |
| 6,495,014 B1 | 12/2002 | Datta et al. | |
| 6,508,936 B1 | 1/2003 | Hassan | |
| 6,537,436 B2 | 3/2003 | Schmidt et al. | |
| 6,607,647 B2* | 8/2003 | Wilkins et al. | 204/523 |
| 6,607,668 B2 | 8/2003 | Rela | |
| 6,649,037 B2 | 11/2003 | Liang et al. | |
| 6,766,812 B1 | 7/2004 | Gadini | |
| 6,780,328 B1 | 8/2004 | Zhang | |
| 6,824,662 B2 | 11/2004 | Liang et al. | |
| 6,896,814 B2 | 5/2005 | Chidambaran et al. | |
| 6,991,733 B2 | 1/2006 | Kin et al. | |
| 7,083,730 B2 | 8/2006 | Davis | |
| 7,501,064 B2 | 3/2009 | Schmidt et al. | |
| 2001/0003329 A1 | 6/2001 | Sugaya et al. | |
| 2001/0037942 A1 | 11/2001 | Schmidt et al. | |
| 2002/0092769 A1 | 7/2002 | Garcia et al. | |
| 2002/0104804 A1 | 8/2002 | Grott | |
| 2002/0144948 A1 | 10/2002 | Aimar et al. | |
| 2002/0189951 A1 | 12/2002 | Liang et al. | |
| 2003/0080467 A1 | 5/2003 | Andrews et al. | |
| 2003/0089609 A1 | 5/2003 | Liang et al. | |
| 2003/0098266 A1 | 5/2003 | Shiue et al. | |
| 2003/0150732 A1* | 8/2003 | Yamanaka et al. | 204/533 |
| 2003/0155243 A1 | 8/2003 | Sferrazza | |
| 2003/0201235 A1 | 10/2003 | Chidambaran et al. | |
| 2003/0205526 A1 | 11/2003 | Vuong | |
| 2004/0035802 A1 | 2/2004 | Emery et al. | |
| 2004/0055955 A1 | 3/2004 | Davis | |
| 2004/0079700 A1 | 4/2004 | Wood | |
| 2004/0089551 A1* | 5/2004 | Liang et al. | 204/524 |
| 2005/0016932 A1 | 1/2005 | Arba et al. | |
| 2005/0103622 A1 | 5/2005 | Jha et al. | |
| 2005/0103630 A1 | 5/2005 | Ganzi et al. | |
| 2005/0103631 A1 | 5/2005 | Freydina et al. | |
| 2005/0103644 A1 | 5/2005 | Wilkins et al. | |
| 2005/0103717 A1 | 5/2005 | Jha et al. | |
| 2005/0103722 A1* | 5/2005 | Freydina et al. | 210/746 |
| 2005/0103723 A1 | 5/2005 | Wilkins et al. | |
| 2005/0103724 A1 | 5/2005 | Wilkins et al. | |
| 2005/0109703 A1 | 5/2005 | Newenzhizen | |
| 2005/0121388 A1 | 6/2005 | Wood et al. | |
| 2005/0263457 A1 | 12/2005 | Wilkins et al. | |
| 2006/0060532 A1* | 3/2006 | Davis | 210/652 |
| 2006/0091077 A1 | 5/2006 | Haas et al. | |
| 2006/0144787 A1 | 7/2006 | Schmidt et al. | |
| 2006/0231403 A1 | 10/2006 | Riviello | |
| 2006/0231495 A1 | 10/2006 | Freydina et al. | |
| 2007/0284251 A1 | 12/2007 | Zuback et al. | |
| 2008/0245738 A1 | 10/2008 | Coulter et al. | |

FOREIGN PATENT DOCUMENTS

| | | |
|---|---|---|
| CA | 2316012 A1 | 11/2001 |
| CN | 104411 A | 8/1990 |
| DE | 2708240 A1 | 8/1978 |
| DE | 3238280 A1 | 4/1984 |
| DE | 4016000 A1 | 11/1991 |
| DE | 4238532 A1 | 11/1992 |
| DE | 44 18 812 A1 | 12/1995 |
| DE | 199 42 347 A1 | 3/2001 |
| EP | 0170895 B1 | 2/1986 |
| EP | 0 503 589 A1 | 9/1992 |
| EP | 0 621 072 A2 | 10/1994 |
| EP | 0 680 932 A2 | 11/1995 |
| EP | 0803474 A2 | 10/1997 |
| EP | 0 870 533 A1 | 10/1998 |
| EP | 1 068 901 A2 | 1/2001 |
| EP | 1172145 A2 | 1/2001 |
| EP | 1075 868 A2 | 2/2001 |
| EP | 1 101 790 A1 | 5/2001 |
| EP | 1 106 241 A1 | 6/2001 |
| EP | 1222954 A1 | 7/2002 |
| EP | 1388595 A1 | 2/2004 |
| EP | 1506941 A1 | 2/2005 |
| FR | 2818267 A1 | 2/2002 |
| GB | 776469 | 6/1957 |
| GB | 877239 | 9/1961 |
| GB | 880344 | 10/1961 |
| GB | 893051 | 4/1962 |
| GB | 942762 | 11/1963 |
| GB | 1048026 | 11/1966 |
| GB | 1137679 | 12/1968 |
| GB | 1 381 681 A | 1/1975 |
| GB | 1448533 | 9/1976 |
| JP | 54-5888 | 1/1979 |
| JP | 60202792 A | 10/1985 |
| JP | 05271015 | 10/1993 |
| JP | 07-265865 | 10/1995 |
| JP | 09-253643 | 9/1997 |
| JP | 2001-79358 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| JP | 06000339 A1 | 1/2004 |
| JP | 2005-007347 | 1/2005 |
| JP | 2005-007348 | 1/2005 |
| RU | 2281255 C1 | 8/2006 |
| WO | WO 92/11089 A1 | 7/1992 |
| WO | WO 95/32052 A1 | 11/1995 |
| WO | WO 95/32791 A1 | 12/1995 |
| WO | WO 96/22162 A1 | 7/1996 |
| WO | WO 97/25147 A1 | 7/1997 |
| WO | WO 97/46491 A1 | 12/1997 |
| WO | WO 97/46492 A1 | 12/1997 |
| WO | WO 98/11987 A1 | 3/1998 |
| WO | WO 98/17590 A1 | 4/1998 |
| WO | WO 98/20972 A1 | 5/1998 |

| | | |
|---|---|---|
| WO | WO 98/58727 A1 | 12/1998 |
| WO | WO 99/39810 A1 | 8/1999 |
| WO | WO 00/30749 A1 | 6/2000 |
| WO | WO 00/64325 A2 | 11/2000 |
| WO | WO 00/75082 A1 | 12/2000 |
| WO | WO 01/49397 A1 | 7/2001 |
| WO | WO 02/04357 A1 | 1/2002 |
| WO | WO 02/14224 A1 | 2/2002 |
| WO | WO 02/26629 A2 | 4/2002 |
| WO | WO 03/086590 A1 | 10/2003 |
| WO | 2004013048 A2 | 2/2004 |
| WO | 2005087669 A1 | 9/2005 |
| WO | 2005113120 A1 | 12/2005 |
| WO | 2006031732 A2 | 3/2006 |
| WO | 2007145785 A1 | 12/2007 |
| WO | 2007145786 A1 | 12/2007 |

OTHER PUBLICATIONS

Dow Chemical, "DOWEX Marathon A Ion Exchange Resin," published Dec. 1999, Product Literature reprinted from www.dow.com.
Dow Chemical, "DOWEX Marathon A2 Ion Exchange Resin," published Nov. 1998, Product Literature reprinted from www.dow.com.
Ganzi, G.C. et al., "Electrodeionization: Theory and Practice of Continuous Electrodeionization," *Ultrapure Water*, Jul./Aug. 1997, pp. 64-69.
Gifford et al. "An Innovative Approach to Continuous Electrodeionization Module and System Design for Power Applications" 7 pages, Oct. 2000.
G.J. Gittens et al., "The Application of Electrodialysis to Demineralisation," A.I.Ch.E.-I.Chem.E. Symposium Series No. 9, 1965 (London: Instn chem. Engrs), pp. 79-83.
Glueckauf, "Electro-Deionisation Through a Packed Bed," *British Chemical Engineering*, Dec. 1959, pp. 646-651.
Hobro et al., "Recycling of Chromium from Metal Finishing Waste Waters Using Electrochemical Ion Exchange (EIX)," 1994, pp. 173-183.
Jha, Anil D. et al., "CEDI: Selecting the Appropriate Configuration," reprinted from *Power Engineering*, Aug. 2000 edition.
Johnson et al., "Desalting by Means of Porous Carbon Electrodes," *Electrochemical Technology*, vol. 118, No. 3, Mar. 1971, pp. 510-517.
Kedem et al., "EDS—Sealed Cell Electrodialysis," *Desalination*, vol. 46, 1983, pp. 291-299.
Korngold, "Electrodialysis Process Using Ion Exchange Resins Between Membranes," *Desalination*, vol. 16, 1975, pp. 225-233.
Matejka, "Continuous Production of High-Purity Water by Electro-Deionisation," *J. Appl. Chem., Biotechnol.*, vol. 21, Apr. 1971, pp. 117-120.
Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.
Pourcelly, Gerald, Conductivity and selectivity of ion exchange membranes: structure-correlations, *Desalination*, vol. 147 (2002) pp. 359-361.
V. Shaposhnik et al., "Demineralization of water by electrodialysis with ion-exchange membranes, grains and nets," *Desalination*, vol. 133, (2001), pp. 211-214.
R. Simons, "Strong Electric Field Effects on Proton Transfer Between Membrane-Bound Amines and Water," *Nature*, vol. 280, Aug. 30, 1979, pp. 824-826.
R. Simons, "Water Splitting in Ion Exchange Membranes," Pergamon Press Ltd., 1985, pp. 275-282.
R. Simons, "The Origin and Elimination of Water Splitting in Ion Exchange Membranes During Water Demineralisation by Electrodialysis," *Desalination*, vol. 28, Jan. 29, 1979, pp. 41-42.
USFilter, "H-Series Industrial CDI® Systems," product information, 1998, 4 pgs.
USFilter, "CDI-LX™ Systems," product information, 2001, 6 pgs, Mar. 2001.
Wood, J.H. et al., "Continuous Electrodeionisation: Module Design Considerations for the Production of High Purity Water," *Proc. of IEX at the Millenium*, Jul. 16, 2000, pp. 44-51.
Wood, "Hot Water Sanitization of Continuous Electrodeionization Systems" *Pharmaceutical Engineering*, vol. 20, No. 6, Nov./Dec. 2000, p . 1-15.
Almulla et al., "Developments in high recovery brackish water desalination plants as part of the solution to water quantity problems," Desalination 153 (2002) pp. 237-243.
Del Pino et al., "Wastewater reuse through dual-membrane processes: opportunities for sustainable water resources," Desalination, vol. 124, No. 1-3, Nov. 1, 1999, pp. 271-277.
Hell et al., "Experience with full-scale electrodialysis for nitrate and hardness removal," Desalination, vol. 117, No. 1-3, Sep. 10, 1998, pp. 173-180.
Larchet et al., Application of electromembrane technology for providing drinking water for the population of the Aral region, Desalination, vol. 149, No. 1-3, Sep. 10, 2002, pp. 383-387.
Sirivedhin et al., "Reclaiming produced water for beneficial use: salt removal by electrodialysis," Journal of Membrane Science, vol. 243, No. 1-2, Nov. 1, 2004, pp. 335-343.
"Preliminary Research Study for the Construction of a Pilot Cogeneration Desalination Plant in Southern California," Water Treatment Technology Program Report No. 7, U.S. Department of the Interior May, 1995.
Nesicolaci, M., "Reverse Osmosis is Taking Global Water & Wastewater Treatment by Storm," Water Purification Solutions, Severn Trent Services, undated.
Tseng, Tai, et al., "Optimization of Dual-Staged Nanofiltration Membranes for Seawater Desalination"; American Water Works Association 2003 CA-NC Annual Fall Conference; Oct. 7, 2003.
King, C. Judson, et al., "Separation Technology in Japan"; Japanese Technology Evaluation Center; International Tech. Research Institute, Loyola College in Maryland, pp. 1-143, Mar. 1993.
"Desalting Handbook for Planners", Desalination and Water Purification Research and Development Program, Report No. 72, 3rd Edition, Jul. 2003, pp. 1 -233.
Mohammad et al., "Predicting flux and rejection of multicomponent salts mixture in nanofiltration membranes," Desalination 157 (2003) 105-111.
www.waterline.com/content/news/article.asp Microfiltration and Ultrafiltration Hold Huge Potential for the Desalination Pretreatment Market, Nov. 14, 2006.
von Gottberg et al., "Optimizing Water Recovery and Energy Consumption for Seawater RO Systems," Water & Process Technologies, General Electric Technical Paper (2005).
World Bank, "Seawater and Brackish Water Desalination in the Middle East, North Africa and Central Asia," A Review of Key Issues and Experience in Six Countries Final Report, Main Report, Dec. 2004.
Public Health and the Environment World Health Organization, "Desalination for Safe Water Supply, Guidance for the Health and Environmental Aspects Applicable to Desalination," Geneva 2007.
Wang et al., "A Study of the electrodeionization process-high-purity water production with a RO/EDI system," Desalination, vol. 132, pp. 349-352, Oct. 3, 2000.
Frost & Sullivan, "Microfiltration and Ultrafiltration Hold Huge Potential for the Desalination Pretreatment Market," published Nov. 14, 2006, Water Online.

* cited by examiner

ELECTRICALLY-DRIVEN SEPARATION APPARATUS

BACKGROUND OF THE INVENTION

1. Field of the Invention

The present invention generally relates to methods, systems, and devices for separating components of liquids under the influence of electrical fields and, more particularly, to methods, systems, and devices for separating components of aqueous solutions containing species to be removed such as minerals, salts, organic compounds, and other ionizable species.

2. Discussion of Related Art

Electrodeionization devices have been disclosed in, for example, Giuffrida et al. in U.S. Pat. Nos. 4,632,745; 4,925, 541; and 5,211,823; by Ganzi in U.S. Pat. Nos. 5,259,936, and 5,316,637; by Oren et al. in U.S. Pat. No. 5,154,809; and by Towe et al. in U.S. Pat. No. 6,235,166.

BRIEF SUMMARY OF THE INVENTION

The invention generally relates to methods, systems, and devices for electrically separating components in liquids such as minerals, salts, ions, organics, as well as other ionizable species, from the liquid carrier.

Thus, some aspects of the invention pertain to separation systems. For example, in one or more embodiments pertinent to such aspects, the invention can involve an electrically-driven separation system comprising a first depleting compartment and a second depleting compartment. Some embodiments of the separation system can further comprise a concentrating compartment disposed between the first and second depleting compartments. In accordance with still further embodiments, the system can comprise a source of an aqueous solution comprising a first cation and a first anion fluidly connected to the first depleting compartment and a source of a salt solution comprising a second cation and a second anion fluidly connected to the second depleting compartment.

In accordance with further embodiments pertinent to such aspects, the invention can involve an electrically-driven separation apparatus comprising a first concentrating compartment, a first depleting compartment disposed adjacent the first concentrating compartment and fluidly connected to a source of an aqueous solution comprising a first cation and a first anion, and a second depleting compartment disposed adjacent the first concentrating compartment and fluidly connected to a source of treated water.

Further aspects of the invention pertain to separation and combination techniques. Still other aspects of the invention can pertain to recovering one or more species contained in a solution. In accordance with one or more embodiments pertinent to such aspects, the invention can involve a method comprising introducing an aqueous solution comprising a first cation and a first anion into a first depleting compartment of an electrical separation apparatus, promoting transport of the first cation from the first depleting compartment into a first concentrating compartment of the electrical separation apparatus, providing a second anion in a second depleting compartment of the electrical separation apparatus, and promoting transport of the second anion into the first concentrating compartment to produce a first product solution comprising the first cation and the second anion.

Other advantages and novel features of the invention will become apparent from the following detailed description of the various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE SEVERAL VIEWS OF THE DRAWINGS

Non-limiting embodiments of the present invention will be described by way of example with reference to the accompanying drawings, which are schematic and are not intended to be drawn to scale. In the drawings, each identical or nearly identical component illustrated is typically represented by a single numeral. For the purposes of clarity, not every component is labeled in every drawing, nor is every component of each embodiment of the invention shown where illustration is not necessary to allow those of ordinary skill in the art to understand the invention. In the drawings.

DETAILED DESCRIPTION OF THE INVENTION

Figure 1:
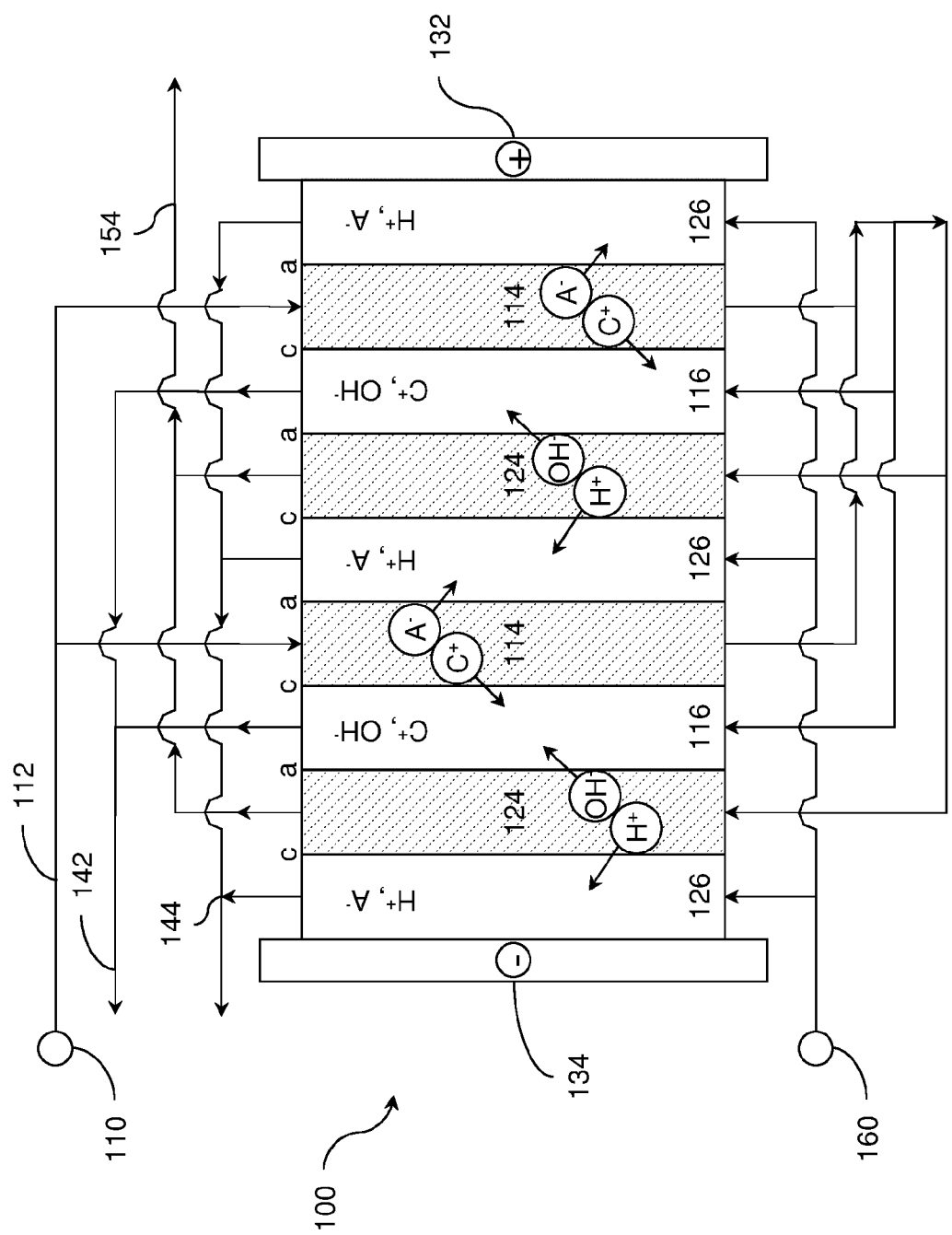
FIG. 1 is a schematic diagram illustrating a portion of an electrical separation apparatus, in accordance with one or more embodiments of the invention.

Some aspects of the invention are directed to systems utilizing electrical separation apparatus. The separation devices of the invention that treat liquids using electrical fields can be used to purify, for example, water, as well as other liquids that contain dissolved species such as, but not limited to, ionic species. The invention also pertains to methods of manufacture, promotion, and use of methods, systems, and devices. The electrodeionization apparatus may be operated in any suitable fashion that achieves the desired product and/or effects the desired treatment. For example, the various embodiments of the invention can be operated continuously, or essentially continuously or continually, intermittently, periodically, or even upon demand.

As used herein, an "electrical separation" apparatus is able to separate one or more components of a liquid, for example, ions dissolved and/or suspended therein, by using an electrical field to influence and/or induce transport or otherwise provide mobility of the dissolved and/or suspended species in the liquid thereby at least partially effecting separation, or removal, of the species from the liquid. The one or more species in the liquid can be considered, with respect to certain aspects of the invention, a "target" species. An electrical separation apparatus is typically an apparatus which can comprise one or more electrically-driven purification devices, and, optionally, other units, assemblies, and/or components operatively associated therewith. Systems incorporating such apparatuses can thus comprise ancillary components and/or subsystems including, but not limited to, pipes, pumps, tanks, sensors, control systems, as well as power supply and distribution subsystems that cooperatively allow operation of the system.

Non-limiting examples of electrical separation devices, or electrically-driven separation apparatus, include electrodialysis devices and electrodeionization devices. The terms "electrodialysis" and "electrodeionization" are given their ordinary definitions as used in the art. Typically within these exemplary devices are concentrating and diluting compartments separated by media having selective permeability, such as anion-selective and cation-selective membranes. In these devices, the applied electric field causes ionizable species, dissolved ions, to migrate through the selectively permeable media, i.e., anion-selective and cation-selective membranes, resulting in the liquid in the diluting compartment being depleted of ions, and the liquid in the concentrating compartment being enriched with the migrant, transferred ions. An electrodialysis device typically has several compartments that are used to dilute or concentrate ions and/or other species in solution in a liquid. An electrodeionization device is similar to an electrodialysis device; but also includes solid "media" (e.g., electro-active media or adsorption media, such as ion exchange media) in one or more compartments within the device. The electro-active media typically provides a path for ion transfer, and/or serve as an increased conductivity bridge between the selective membranes to facilitate movement of ions within compartments of the device. The media is generally able to collect or discharge ionic and/or other species, e.g. by adsorption/desorption mechanisms. The media may carry permanent and/or temporary electrical charge, and can operate, in some instances, to facilitate electrochemical reactions designed to achieve or enhance performance of the electrodeionization device, e.g., separation, chemisorption, physisorption, and/or separation efficiency. Examples of media that may be utilized in accordance with some embodiments of the invention include, but are not limited to, ion exchange media in formats such as particles, fibers, and membranes. Such materials are known in the art and are readily commercially available. Combinations of any of the above-mentioned formats may be utilized in any one or more of the various embodiments of the invention.

The phrase "target species" refers to species that are dissolved and/or suspended in a fluid, typically a liquid, which is desired to be removed or transferred from a first solution to another solution, typically using an electrical purification device. Examples of target species that are desirably removed or transported from a liquid using certain electrical purification apparatuses of the invention include certain ionic species, organic molecules, weekly ionized substances, ionizable substances in the operating environment within an electrical separation apparatus, and, in some cases, organisms. Target ionic species that are desirably removed or transported in accordance with some aspects of the invention can be one or more ions able to precipitate from solution, and/or are able to react with other species and/or ions in a solution to form salts and/or other compounds that are able to precipitate from solution, so as to cause substantial scaling during operation of an electrical purification apparatus. Some particular aspects of the invention involve target species that can be considered a component that can form "scale" or a substantially insoluble deposit. Non-limiting examples of target ionic species can include $Ca^{2+}$, $Mg^{4+}$, $Si^{4+}$, $Cu^{2+}$, $Al^{3+}$, $Fe^{3+}$, $Mn^{2+}$, $Pb^{3+}$, $Pb^{4+}$, $SO_4^{2-}$, $SiO_4^{2-}$, and $HCO_3^-$, as well as combinations of any two or more of these. Typical, non-limiting concentrations of target ionic species in feed water include: at least about 50 mg/L or more.

Another example of a target species, in certain embodiments, is an organic molecule, which may be naturally occurring and/or otherwise present within the liquid, for example, as a pollutant. Non-limiting examples of organic molecules that may be target species include naturally-formed organic acids, such as huric acid, fulvic acid, ulmic acids, which may be created through the degradation of organic of organic matter; non-naturally occurring organic molecules, which can act as pesticides, herbicides, endocrine disruptors, caffeine, hormones or hormone analogs, and hydrocarbons such as gasoline or oils; byproducts of organisms, such as bacterial endotoxins, enzymes, and proteins; and, in certain cases, entire organisms, such as viruses, bacteria, cysts, and oocysts.

The terms "organic," "organic material," "organic compounds," and "organic molecule," are given their ordinary meanings as used in the art. Thus, these terms can refer to one or more carbon-containing compounds. Organics, depending on their nature and composition, may be present in a non-ionized, or in an ionized variant.

The phrase "non-precipitatable species" or "soluble species" refers to a species, which can be an ionic component thereof that does not readily precipitate from solution, or react with other species and/or ions in a solution to form salts and/or other compounds that precipitate and cause substantial scaling, at concentrations typically encountered in operation of electrical purification apparatuses. For example, a non-inclusive list of non-precipitatable species include the ions, $Na^+$, $Cl^-$, $K^+$, and $H^+$. Such non-precipitatable ions can, in some embodiments of the invention, be considered non-target ions and be representative examples of matrix species, which refers, generally, to species that are dissolved and/or suspended in a liquid.

As used herein, "substantial scaling" refers to conditions in which the formation of scaling deposits created by, for example, target ionic species, that adversely affects the proper functioning and performance of the various systems and/or apparatuses of the invention. A scaling deposit is usually substantially insoluble, i.e., a deposit that does not substantially lose its mass (i.e., dissolve) when left undisturbed and exposed to pure water under ambient conditions for extended periods of time. For example, a substantially insoluble deposit may retain at least about 95% of its initial mass after being left undisturbed and exposed to pure water for a day under ambient conditions. As used herein, the phrase "hardness ions" refer to species that can form a compound that deposits as scale. Hardness species include, for example, the cations $Ca^{2+}$ and $Mg^{2+}$ as well as particular associated anionic species such as $SiO_4^{2-}$, $SiO_4^{4+}$, $Si_2O_7^{6-}$, $Si_2O_5^{2-}$, $Si_3O_9^{6-}$, $Si_6O_{18}^{12-}$, $F_2^{2-}$, $CO_3^{2-}$, and $HCO_3^-$. Hardness ions can be target ionic species, in certain aspects of the invention. Also, as used herein, "hard water" is water or an aqueous solution containing a substantial amount of one or more of the hardness ions, typically in amounts that enable substantial scaling to occur. For example, hard water may have a hardness of at least about 1 mg/L or even about 50 mg/L, of one or more types of hardness ions present, and in some cases, at least about 75 mg/L, at least about 100 mg/L, at least about 125 mg/L, at least about 150 mg/L, at least about 175 mg/L (10 grains/gallon), at least about 200 mg/L, at least about 225 mg/L, or at least about 250 mg/L. Hard water may have a hardness quantified as at least about 10 ppm of one or more types of harness ions, and in some cases, at least about 20 ppm, at least about 25 ppm, at least about 50 ppm, at least about 75 ppm, or at least about 100 ppm of one or more types of hardness ions present.

In accordance with one or more particular aspects, the invention can relate to methods, systems, and devices for electrically purifying liquids containing species such as minerals, salts, ions, organics, and the like that can be induced to migrate under the influence of an applied force. In such aspects, the liquid in the diluting compartment is desired, i.e., a product, while the liquid in the concentrating compartment may be discarded as a reject. However, some aspects of the invention contemplate applications directed to retrieving ionized or even ionizable species, in a liquid stream, especially aqueous streams, to recover one or more of such species for, for example, reuse in an upstream unit operation or for use in other processes.

Some embodiments of the invention pertinent to, for example, treatment systems, may utilize one or more pretreatment steps to reduce the concentration of species within the entering liquid that can cause scaling or fouling. Thus, embodiments directed to the systems and techniques of the invention may involve one or more pre-softening unit operations or steps. Thus, some pre-treatment systems and techniques may be directed to reducing the likelihood of forming scale. Embodiments directed to such aspects can rely on, for example, considerations related to physicochemical properties of hardness related species.

In one or more embodiments pertinent to aspects directed to separation apparatus and systems, the invention can provide electrically-driven separation systems comprising one or more depleting compartments and one or more concentrating compartments. Other embodiments of the invention contemplate configurations comprising a second depleting compartment. For example, the electrically-driven separation system can comprise a first depleting compartment, a concentrating compartment, and a second depleting compartment. One or more such embodiments can be configured such that the concentrating compartment is in ionic communication with at least one of the first and the second depleting compartments. In some cases, the concentrating compartment is disposed between the first and second depleting compartments. Several embodiments of the invention involve separation system configurations that comprise a plurality of first depleting compartment types and, where suitable, at least one second depleting compartment type. Further configurations, however, are not precluded in some embodiments of the invention. For example, some embodiments of the invention involve separation systems configured to comprise at least one first depleting compartment type and a plurality of second depleting compartment type. Indeed, in several embodiments of the invention, the systems can comprise at least one first depleting compartment, or type; at least one second depleting compartment, or type; at least one first concentrating compartment, or type; and at least one second concentrating compartment, or type. Thus, various embodiments of the invention can be practiced as configurations comprising a plurality of first depleting compartments, a plurality of second depleting compartments, a plurality of first concentrating compartments, and a plurality of second depleting compartments.

One or more embodiments of the invention pertinent to separation systems can further include a source of an aqueous solution to be processed. In such configurations, the source of aqueous solution is typically fluidly connected to at least one of the first depleting compartment and second depleting compartment. In some embodiments of the invention, however, the source of the aqueous solution may be fluidly connected to a two or more first depleting compartments and/or two or more second depleting compartments. The aqueous solution can be a salt solution comprising at least one soluble cationic species and at least one soluble anionic species. Further embodiments of systems of the invention can also involve configurations with a source of a second solution, i.e., a second source of another aqueous solution, typically an aqueous solution that compositionally differs from the aqueous solution from the first source. The second source can provide, for example, a salt solution comprising a second cationic species and a second anion species. Of course, variants of these configurations are contemplated including, for example, a plurality of sources of solutions. Particular embodiments of the invention, however, contemplate configurations wherein one or more of the aqueous solutions comprise soluble or even non-precipitating species. For example, some embodiments of the invention involve a source of a salt solution, comprising sodium and chloride ions, fluidly connected to at least one depleting compartment.

FIG. 1 schematically illustrates a portion of one or more embodiment of an electrical separation apparatus 100 in accordance with some aspects of the invention. In this figure, electrical separation apparatus 100 is embodied as an electrodeionization device. Electrical separation apparatus 100 may, however, include, be instead of or in addition to the illustrated electrodeionization device, other devices, such as electrodialysis devices and/or additional electrical separation apparatuses. In FIG. 1, a liquid to be purified from source or point of entry 110 is introduced into apparatus 100 through conduit 112. Conduit 112 can serve as a manifold fluidly connecting source 110 to a plurality of compartments. Apparatus 100 can thus comprise a plurality of first depleting compartments 114 fluidly connected to source 110 through manifold 112. The plurality of compartments can be separated by one or more ion-selective membranes c and a. In the embodiment depicted in FIG. 1, ion-selective membranes a and c are arranged as a series of cation-selective membranes (designated as "c") that preferentially allow cations to pass therethrough, relative to anions; and anion-selective membranes (designated as "a") that preferentially allow anions to pass therethrough, relative to cations. Those ordinarily skilled in the art would recognize that, in accordance with certain aspects of the invention, other types and/or arrangements of selective membranes can also be used.

Separation apparatus 100 can also comprise one or more concentrating compartments 116. As illustrated, concentrating compartments 116 are disposed adjacent to at least one depleting compartment, such as compartment 114. In some embodiments of the invention, at least one concentrating compartment is in ionic communication with at least one depleting compartment through at least one selectively permeable membrane. Thus, as illustrated, at least one concentrating compartment 116 is disposed adjacent to and in ionic communication with at least one depleting compartment 114 through cation selective membrane c.

Further embodiments of the invention contemplate electrical separation apparatus comprising at least one second depleting compartment. In accordance with at least one further embodiment, the electrical separation apparatus can further comprise a plurality of second depleting compartments, which can functionally differ with respect to the type, and/or composition of the fluid introduced therein. Structural differences, however, may also distinguish the second depleting compartment from the first depleting compartment. Thus, some embodiments of the apparatus can involve at least two of types of depleting compartments. Like the first depleting compartment, the second depleting compartment can be disposed adjacent to and be in ionic communication with at least one concentrating compartment, typically through one or more selectively permeable membrane. Further, configurations of the invention can thus be embodied such that apparatus 100 comprises a plurality of second depleting compartments 124, each of which is in ionic communication with at least one second concentrating compartment 116 through anion selective membrane a, which can also define a boundary between the compartments.

Still further embodiments of the invention can involve apparatuses comprising at least one second concentrating compartment. In such embodiments, the electrically-driven apparatus 100 can comprise a plurality of second concentrating compartments, which can functionally differ, with respect to the type, composition of fluid or collected species flowing therein. As with the depleting compartments, structural differences may also distinguish the second concentrating compartment from the first depleting compartment. Therefore, in accordance with one or more embodiments, the apparatus can comprise at least two of types of concentrating compartments. Like the first concentrating compartment, the second concentrating compartment can be disposed adjacent to and be in ionic communication with at least one depleting compartment, typically through one or more selectively permeable membrane. With reference again to FIG. 1, apparatus 100 can comprise one or more second concentrating compartments, which can be disposed adjacent to at least one of first depleting compartment 114 and/or second depleting compartment 124. Typically, at least one selectively permeable membrane can be disposed and/or define a boundary between second concentrating compartment 126 and the depleting compartments. As exemplarily illustrated, at least one second concentrating compartment 126 can be disposed between first depleting compartment 114 and second depleting compartment 124, with anion selective membrane a and cation selective membrane c, respectively facilitating ionic communication between the depleting compartments and the concentrating compartment.

Typical configurations of the electrically-driven separation apparatus of the invention include at least one electrode pair through which an applied force, such as an electric field, can facilitate transport or migration of the one or more ionic, or ionizable, species. Apparatus 100 can thus comprise at least one anode 132 and at least one cathode 134. A second source 160 of a liquid can be introduced into the first and/or concentrating depleting compartments 116 and/or 126 to facilitate or carry the migrated species into these compartments. In some embodiments, however, configurations of the invention can involve fluidly connecting an outlet of one or more of first depleting compartments to an inlet of one or more second depleting compartments and/or an inlet of one or more first concentrating compartments. Still other embodiments can involve a second source of a liquid introduced into an inlet of one or more second concentrating compartments.

Still further embodiments of the invention involve configurations of electrically-driven apparatus comprising a plurality of first depleting compartments 114, a plurality of first concentrating compartments 116, a plurality of second depleting compartments 124, and a plurality of second concentrating compartments 126. In some cases, treated water or an aqueous solution comprising a second cation, which is typically but not necessarily different from the first cation, and a second anion, which is preferably but not necessarily different from the first anion, is introduced into the second depleting compartment. The treated water or aqueous solution can be provided by a source 160. In some cases, the treated water can be provided by the electrically-driven apparatus. For example, the treated water can be water from a stream processed by the apparatus. Indeed, in accordance with one particular embodiment, the treated water can be provided by a stream treated in the first depleting compartment. The applied electric field can promote migration or transport of the second cation introduced into second depleting compartment 124 into the first and/or second concentrating compartments and also can promote migration or transport of the second anion into the first and/or second concentrating compartments. By configurationally arranging the first and second depleting compartments and the first and second concentrating compartments, the first cation and the second anion can be promoted to migrate into the first concentrating compartment while, in some cases, the second cation and the first anion can be promoted to migrate into the second concentrating compartment. Further embodiments of the invention contemplate configurations wherein the first and/or second concentrating compartments are fluidly connected to one or more sources of treated water. Still further embodiments can involve configurations wherein at least a portion of a fluid stream that is directable into the first concentrating compartment, the second concentrating compartment, or both is provided or supplied by one or more sources of treated water. In some cases, the one or more sources of treated water can be the first and/or second depleting compartments of the same or another apparatus. In still further configurations, a stream from the first depleting compartment serves as a source of treated water introduced into one or more of the second depleting compartment, the first concentrating compartment, and the second concentrating compartment.

Some aspects of the invention pertain to treating or converting an aqueous solution to provide, for example, one or more product streams. One or more embodiments directed to treating aqueous solutions can involve purifying the aqueous solution to remove one or more undesirable species therefrom. Certain embodiments thereof advantageously provide thermodynamically unfavorable conditions that inhibit the formation of precipitates. Other embodiments of the invention can advantageously provide a product formed from a combination of one or more sources. Thus in some embodiments of the invention, treatment techniques can involve reducing the likelihood of scale formation in at least one unit operation thereof and other embodiments can provide one or more products produced from one or more reactants. One or more embodiments of techniques of the invention can comprise providing an aqueous solution to be treated by removing one or more species therefrom. The one or more species to be removed can be one or more cationic and/or one or more anionic species in the aqueous solution. The techniques of the invention can further comprise introducing the aqueous solution comprising, for example, a first cation and an associated first anion into one or more depleting compartments of an electrical separation apparatus such as any of the configurations of electrically-driven devices discussed above. The one or more target species can be induced or promoted to migrate from the aqueous solution into one or more concentrating compartments of the separation apparatus. Further embodiments of the invention may involve promoting the transport or migration of one or more other target species, e.g., an associated species, into one or more depleting compartments of the device. Still further embodiments may involve promoting or migration of one or more additional species into various compartments of chambers of the device. Indeed in some cases, the invention can be embodied as a method comprising one or more steps of introducing an aqueous solution, which comprises a first cation and a first anion, into a first depleting compartment of an electrical separation apparatus. The method can further comprise one or more steps of providing a second anion in a second depleting compartment of the apparatus as well as one or more steps of promoting transport of the first cation, from the first depleting compartment, into a first concentrating compartment thereof and one or more steps of promoting transport of the second anion into the first concentrating compartment. The techniques of the invention can thus provide a first product solution comprising the first cation and the second anion. Optional embodiments of the invention can involve one or more steps that promote transport of a second anion, which can be provided in, for example, the second depleting compartment, and the first anion into a second compartment of the apparatus to produce a second product solution comprising the second anion and the first anion.

Particular aspects of the invention can involve treating water. In such cases, embodiments of the invention can comprise one or more steps of providing the second anion. Particular embodiments can be manifested as electrolyzing treated water. The second cation can thus be an oxonium ion, i.e., $H^+$, and, in some cases, the second anion can be a hydroxyl ion, i.e., $OH^-$. The treated water may be provided from any suitable or appropriate source including, for example, water purified by this and/or another electrical separation apparatus. Thus, certain embodiments of the invention can be practiced by introducing water, exiting from the first depleting compartment, into the second depleting compartment of the electrical separation apparatus.

Further embodiments of the invention can be directed to applications involving species that have a propensity to precipitate. The first cation can be an alkali earth ion or complex thereof. The first anion can be a species that tends to form an insoluble compound in solutions having a non-acidic, or high pH, conditions. Indeed, in accordance with one or more aspects and with reference to FIG. 1, the invention can be embodied as a method comprising steps of introducing an aqueous solution from a source 110 comprising a first cation, represented as $C^+$, and a first anion, represented as $A^-$, into a first depleting compartment 114 of an electrical separation apparatus 100, promoting transport of the first cation from first depleting compartment 114 into a first concentrating compartment 116 of electrical separation apparatus 100, providing a second anion, exemplarily represented as $H^+$, in a second depleting compartment 124 of electrical separation apparatus 100, and promoting transport of second anion $H^+$ into first concentrating compartment 116 to produce a first product solution comprising the first cation and the second anion. The various species described herein have been exemplified as having a valence of +1 or −1; the invention, however, can be practiced to selectively promote-removal, and/or collection, of species having other valence magnitudes. For example, one or more anionic target species may be a carbonate or any silicate, including any of the hardness anion species mentioned above. Thus, some aspects of the invention are directed to treating water by promoting transport of hardness-causing species into one or more concentrating compartments. Further features of the invention thus advantageously create conditions that inhibit the precipitation of insoluble species.

Stated another way, some aspects of the invention displaces or relocates scale-forming, e.g., target species, into conditions that oppose scale-forming tendencies. The invention thus provides techniques of treating water in an electrically-driven separation apparatuses while reducing any tendency to form substantial scale in one or more compartments thereof. With reference to FIG. 1, a portion of treated water, having at least a portion of cations and anions removed therefrom in first depleting compartment 114, can be introduced into second depleting compartment 124. In second depleting compartment 124, treated water can be promoted to provide a second cation and a second anion. For example, the treated water can be electrolyzed to produce an oxonium species and a hydroxide species. The second cation, such as the oxonium ion, can be promoted to migrate to second concentrating compartment 126 and the second anion, such as the hydroxide ion, can be promoted to migrate to the first concentrating compartment 116. Where sufficient amounts of such species are provided and transport or migrate, the first concentrating compartment can be rendered basic such that liquid contained or flowing therein has a pH of greater than about 7 pH units. Likewise, the second concentrating compartment can be rendered to be acidic such that liquid contained or flowing therein has a pH of less than about 7 pH units. Thus, some embodiments of the invention provide treating the aqueous solution in a stage, reducing the concentration of, for example, first cation and first anion concentrations and treatment in a second stage while reducing the tendency to form scale by providing conditions in concentrating compartments.

As mentioned above, however, the invention contemplates other sources of treated water and is not limited to self-produced water. Thus, external sources of water or other sources of the second cation and the second anion, e.g., oxonium and hydroxide species, can be used.

As mentioned above, electrical separation apparatus 100 illustrated in FIG. 1 may be operated by applying an electric field across the compartments through electrodes 132 and 134. Operating parameters of apparatus 100 may be varied to provide desirable characteristics. For example, the applied electric field may be varied in response to one or more characteristics or conditions. Thus, the electric field strength may be held constant or altered in response to a characteristic of the apparatus. Indeed, the one or more operation parameters may be altered in response to one or more sensor measurements, e.g., pH, resistivity, concentration of an ion or other species, for instance, calcium, magnesium, sodium, carbonate, bicarbonate, or hydroxide. The electric field imposed through electrodes 132, 134 facilitates migration of charged species such as ions from within diluting compartments 114, 124 through ion-selective membranes a and/or c into concentrating compartments 116 and/or 126. During operation of some embodiments of the invention, a concentrate liquid exits concentrating compartments 116 and is directed to an outlet through conduit 142. In embodiments including one or more second concentrating compartments, liquid exiting therefrom is collected and directed through conduit 144. Liquid exiting depleting compartment 114 may be collected and directed through conduit 152. In embodiments including one or more second depleting compartments, liquid exiting therefrom is typically directed and collected through conduit 154.

Liquid entering electrical separation apparatus 100 may be any liquid where separation of the liquid into a "concentrated" portion, typically containing a higher concentration of dissolved and/or suspended species, i.e., ions and/or organics relative to entering liquid, and an "purified" portion, i.e., containing a lower concentration of dissolved and/or suspended species, i.e., ions, organics, etc., relative to entering liquid, is desired. For example, the liquid may be an organic liquid and/or an aqueous solution, that can be less than completely pure water, for example fresh water, salt water, wastewater, etc. In another example, the liquid to be treated may originate from a unit operation producing a liquid and/or operating on a liquid, such as, but not limited to, unit operations for ultrafiltration, nanofiltration, sedimentation, distillation, humidification, reverse osmosis, dialysis, extraction, chemical reactions, heat and/or mass exchange. In certain embodiments, the liquid may originate from a reservoir, such as a storage vessel, a tank, or a holding pond, or from a natural or artificial body of water. Between the point of entry and the electrodeionization device may be any number of operations or distribution networks that may operate on the liquid. For example one or more unit operations such as those involving reverse osmosis, filtration, such as microfiltration or nanofiltration, sedimentation, activated carbon filters, electrodialysis or electrodeionization devices may be included.

The one or more selectively permeable membranes may be any ion-selective membrane, neutral membrane, size-exclusive membrane, or even a membrane that is specifically impermeable to one or more particular ions or classes of ions. In some cases, an alternating series of cation- and anion-selective membranes is used within the electrically-driven apparatus. The ion-selective membranes may be any suitable membrane that can preferentially allow at least one ion to pass therethrough, relative to another ion.

As noted, one or more of compartments of the electrical separation apparatus can be filled with media such as adsorption media, for example, ion exchange media. The ion exchange media, in some embodiments, can include resins such as cation exchange resin, a resin that preferentially adsorbs cations, or an anion exchange resin, a resin that preferentially adsorbs anions, an inert resin, as well as mixtures thereof. Various configurations may also be practiced. For example, one or more compartments may also be filled with only one type of resin, e.g., a cation resin or an anion resin; in other cases, the compartments may be filled with more than one type of resin, e.g., two types of cation resins, two types of anion resins, a cation resin, and an anion resin. Non-limiting examples of commercially available media that may be utilized in one or more embodiments of the invention include, acrylic gel resin, such as SF-120 cation resin and IRA-458 anion resin, both available from Rohm and Haas, Philadelphia, Pa.

The media contained within the compartments may be present in any suitable shape or configuration, for example, as substantially spherical and/or otherwise shaped discrete particles, powders, fibers, mats, membranes, extruded screens, clusters, and/or preformed aggregates of particles, for example, resin particles may be mixed with a binding agent to form particle clusters. In some cases, the media may include multiple shapes or configurations. The media may comprise any material suitable for adsorbing ions, organics, and/or other species from a liquid, depending on the particular application, for example, silica, zeolites, and/or any one or mixture of a wide variety of polymeric ion exchange media that are commercially available and whose properties and suitability for the particular application are well known to those skilled in the art. Other materials and/or media may additionally be present within the compartments that, for example, can catalyze reactions, or filter suspended solids in the liquid being treated.

Further, a variety of configurations or arrangements may exist within the compartments. Thus, one or more compartments of the separation systems of the invention may involve additional components and/or structures such as, but not limited to, baffles, mesh screens, plates, ribs, straps, screens, pipes, carbon particles, carbon filters, which may be used to, in some cases, contain the ion exchange media, and/or control liquid flow. The components may each contain the same type and or/number of the various components and/or be of the same configuration or may have different components and/or structure/configurations.

The feed liquid may be purified within the electrical separation apparatus to produce a stream of purified liquid having less than about 1 ppm, or in some cases, less than about 50 ppm of one or more target species. In some cases, the total concentration of target species in the purified liquid may be less than about 50 ppm. In these and/or other embodiments, a feed liquid may be purified such that at least about 50% of one or more target species, for example, a hardness ion, is removed from the feed liquid. In some cases, at least about 50% of all of the target species may be removed from the feed liquid. In certain instances, a feed liquid may be purified to produce a stream of purified water having an electrical resistivity of greater than about 0.1 megohm-cm, greater than about 1 megohm-cm, greater than about 3 megohm-cm, greater than about 6 megohm-cm, greater than about 9 megohm-cm, greater than about 12 megohm-cm, greater than about 15 megohm-cm, or at least about 18 megohm-cm.

During operation, an electric field can be applied across the diluting and concentrating compartments through the electrodes, thereby creating a potential gradient that facilitates migration of ions from the diluting compartments towards the one or more concentrating compartments. The electric field may be applied essentially perpendicular to liquid flow within the device. The electric field may be substantially uniformly applied across the diluting and concentrating compartments, resulting in an essentially uniform, substantially constant electric field across the compartments; or in some cases, the electric field may be non-uniformly applied, resulting in a non-uniform electric field density across the compartments. In some embodiments of the invention, the polarity of the electrodes may be reversed during operation, reversing the direction of the electric field within the device, for example, as described by Gallagher et al., in U.S. Pat. No. 5,558,753, or by Giuffrida et al., in U.S. Pat. No. 4,956,071, issued Sep. 11, 1990, entitled "Electrodeionization Apparatus and Module," by Giuffrida et al., both of which are incorporated herein by reference. Polarity reversal techniques may provide advantageous condition that can, for instance, facilitate regeneration of media within the electrodeionization device while simultaneously effecting liquid purification.

The electrodes may each independently be made out of any material suitable for creating an electric field within the device. In some cases, the electrode material can be chosen such that the electrodes can be used, for example, for extended periods of time without significant corrosion or degradation. Suitable electrode materials and configurations are well known in the art.

Electrical apparatus 100 may also have include additional, non-illustrated, configurations and/or components, such as additional electrodes, piping configurations, unit operations, pumps, reservoirs, valves, stirrers, surge tanks, sensors, control elements, etc. whose function, utility, and placement would be apparent to those of ordinary skill in the art. In some cases, electrodeionization device 110 within electrical separation apparatus 100 can have other internal geometries than illustrated. For example, apparatus 100 may be configured to have cylindrical, rectangular, or spiral compartments or aspects. Different inlet and/or outlet configurations may also be used in certain cases within electrical separation apparatus 100 and/or electrodeionization device 110. It should therefore be understood that the systems and methods of the present invention may be used in connection with a wide variety of systems where the purification of one or more liquids may be desired; thus, the electrical separation apparatus may be modified by those of ordinary skill in the art as needed for a particular process, without departing from the scope of the invention.

In certain embodiments the invention, the electrical separation apparatus allows for the removal of a significant amount of dissolved and/or suspended organics from water or other liquids. For example, the electrical separation apparatus may include an electrodeionization device containing a media able to adsorb one or more organics (which may be charged or uncharged), thus removing at least some of the organics from the liquid to be purified. In some cases, the electrodeionization device may be able to remove organics from the liquid to be purified without the occurrence of substantial fouling within the electrodeionization device. As used herein, "substantial fouling" refers to conditions in which the formation of fouling deposits created by the organic material adversely affects the proper functioning and performance of the electrical separation apparatus. Examples of suitable media include, in addition to those described above, carbon particles, carbon filters, macroporous ion exchange resins, acrylic based resins, etc. In certain embodiments, an applied electric field may facilitate transport of a charged organic species from a diluting compartment into a concentrating compartment, e.g., across an ion-selective membrane, as previously described.

Figure 2:
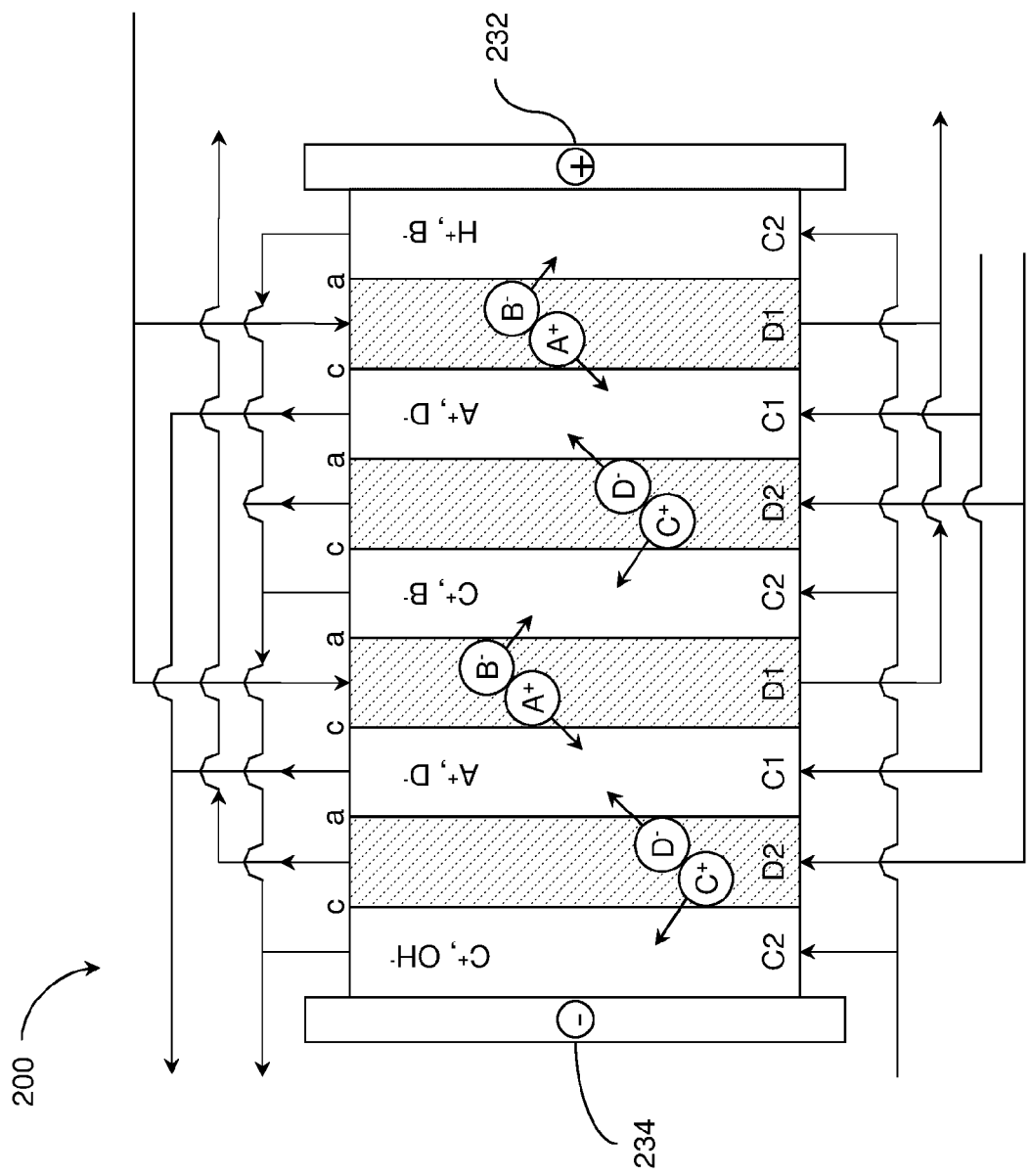
FIG. 2 is a schematic diagram illustrating a portion of an electrical separation apparatus, in accordance with other embodiments of the invention.

An alternative embodiment which can be regarded as being directed to recovering one or more product streams from one or more streams is exemplarily illustrated in FIG. 2. As embodied in this representation of the invention, electrically-driven apparatus 200 comprises at least one first depleting compartment D1 and at least one first concentrating compartment C1, each of which can be disposed adjacent to and in ionic communication with at least one first depleting compartment D1, typically through cation selective membrane c. Separation apparatus 200 can further comprise at least one second depleting compartment D2 and at least one second concentrating compartment C2, each of which can be disposed adjacent to and in ionic communication with at least one second depleting compartment D2, typically through cation selective membrane c. Typically, first depleting compartment D1 is also in ionic communication with at least one second concentrating compartment C2 through anion selective membrane a.

A first aqueous solution comprising at least a first cation, $A^+$, and at least a first anion, $B^-$, can be introduced into first depleting compartment D1. A second aqueous solution comprising at least a second cation, $C^+$, and at least a second anion, $D^-$, can be introduced into second depleting compartment D2. An electric field can be applied across apparatus 200 through electrodes 232 and 234 to promote migration of the cations and anions. For example, first cation $A^+$ can migrate from first depleting compartment D1 into first concentrating compartment C1 through cation-selective membrane c; second anion $D^-$ can migrate from second depleting compartment D2 into first concentrating compartment C1 through anion-selective membrane a. In some cases, first anion $B^-$ can migrate from first depleting compartment D1 into second depleting compartment C2 through anion-selective membrane a while second cation $C^+$ can migrate from second depleting compartment D2, typically also into second concentrating compartment C2, but instead through cation-selective membrane c. The apparatus thus provides for the separation of components of a first aqueous solution and a second aqueous solution to provide a third aqueous solution comprising at least one component of the first aqueous solution and the second solution and, in some cases, a fourth aqueous solution comprising different components from the first and second aqueous solution. Such aspects of the invention can advantageously provide for the recovery of species, e.g., from one of the first and second solutions, and provide a solution that can be further utilized. This recovered or generated solution can be used upstream of the electrical separation apparatus or be utilized as a raw material for unassociated processes. For example, the generated stream can contain $Na^+$ and $Cl^-$ species, which can be used to regenerate ion exchange media in a water treatment unit operation. Other examples may involve recovering metal ions from one or more processes.

It should be understood that the above descriptions are exemplary in nature, and many other configurations and variations are possible. For example, additional valves, inlets, pathways, reservoirs, surge tanks, outlets, sensors, activators, control systems, piping, filters, etc. may be used in an electrical separation apparatus of the invention, or the electrical purification apparatus may be combined and/or provided with other fluid purification techniques/systems and/or unit operations. For example, the electrical purification apparatus may be constructed and arranged to supply liquid to the electrodeionization device in the event of a failure of the source of energy and/or a loss of feed water flow to the electrodeionization device, for example, using a surge tank.

EXAMPLES

Non-limiting examples of modes of operation of certain electrical purification apparatuses/systems of the invention are now described. The following example is intended to illustrate certain aspects of certain embodiments of the present invention, but do not exemplify the full scope of the invention.

Example 1

This example illustrates the use of an electrodeionization device as an electrically-driven separation apparatus, in accordance with one embodiment of the invention.

The electrodeionization apparatus was assembled to have the configuration as substantially illustrated in FIG. 1. Feed water containing an alkali earth species, calcium, was introduced into first depleting compartment 114 wherein an electric field, applied through electrodes 132 and 134, induced migration of the first cationic species, $Ca^{2+}$ (represented as $C^+$), into first concentrating compartment 116. Selectively-permeable membrane c allowed transport of the first cationic species from compartment 114 into compartment 116. The applied electric field also promoted transport of the first anionic species, $HCO^-$ (represented as $A^-$), in the feed water from first depleting compartment 114 into second concentrating compartment 126 through selectively-permeable membrane a. Treated water exiting first depleting compartment 114 was introduced into second depleting compartment 124, wherein the water was further treated, e.g., de-ionized. In second depleting compartment 124, a second cationic species, oxonium ions ($H^+$), and a second anionic species, hydroxide ions ($OH^-$), were generated or provided. The applied electric field also induced transport or migration of the oxonium ion from second depleting compartment 124 into second concentrating compartment 126 as well as transport or migration of the hydroxide ion from second depleting compartment 124 into first concentrating compartment 116.

The electrodeionization apparatus was comprised of 4 first depleting compartments D1, 4 second depleting compartments D2, 4 first concentrating compartments C1, and 4 second concentrating compartments C2. Each of the compartments contained about 50% SF-120 resin and about 50% IRA-458 resin. Feed water (aqueous solution to be treated) introduced into the first depleting compartments was prepared by adding calcium chloride to water having a conductivity of about 8 μS/cm (treated by reverse osmosis) to achieve an effective calcium concentration of about 7 ppm. The flow rate of the aqueous solution introduced into the first depleting compartments was about 0.54 L/min. The flow rate of the water stream out of the second depleting compartments (the product) was about 0.36 L/min. The flow rate of the water stream from the second concentrating compartments was about 0.18 L/min. Water into the first concentrating compartment had a pH of between about 6.2 and 6.5 pH units, with about 4 ppm $HCO_3^-$, and about 2 ppm equivalent $CO_2(H^+)$.

The $H^+$ species that migrated into second concentrating compartment 126 decreased the pH of the aqueous solution contained or flowing therein; whereas the $OH^-$ species that migrated into first concentrating compartment 116 increased the pH of the aqueous solution contained or flowing therein.

Table 1 lists the operating parameters of the electrodeionization apparatus after steady state operation was established.

This example thus shows that feed water can be treated to remove species, which can have a can have a tendency to form scale. Scaling, however, can be avoided by creating conditions in concentrating compartments that thermodynamically inhibit precipitation of the scale-forming species. In particular, an electrodeionization apparatus was operated in accordance with the invention that was capable of treating water with about ten times higher concentration of hardness ions than a typical apparatus because the hardness-causing species was separated into a compartment with conditions that do not promote scale, i.e., low pH.

TABLE 1

| | |
|---|---|
| Applied Current | 0.25 A |
| Applied Potential | 71.5 V |
| Feed Water Conductivity | 21.5 µS/cm (7 ppm calcium) |
| Conductivity of Water Exiting from First Depleting Compartment | 2.4 µS/cm |
| Resistivity of Water Stream Exiting from the Second Depleting Compartment (Product) | 15.4 megaΩ-cm |
| Properties of Water Stream Exiting the Second Concentrating Compartment | 3 pH units |
| | 0.1 ppm $Ca^{2+}$ |
| | 42.5 ppm equivalent $CO_2$ ($H^+$) |
| | 332 µS/cm |
| Properties of Water Stream Exiting the First Concentrating Compartment | 9 pH units |
| | 27 ppm $OH^-$ |
| | 2 ppm $HCO_3^-$ |
| | 25.5 ppm $Ca^{2+}$ |
| | 152 µS/cm |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only, optionally including elements other than B; in another embodiment, to B only, optionally including elements other than A; in yet another embodiment, to both A and B, optionally including other elements.

As used herein in the specification and in the claims, the term "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives, i.e., "one or the other but not both," when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, the phrase "at least one of A and B" or, equivalently, "at least one of A or B," or, equivalently "at least one of A and/or B" can refer, in one embodiment, to at least one, optionally including more than one, A, with no B present, and optionally including elements other than B; in another embodiment, to at least one, optionally including more than one, B, with no A present, and optionally including elements other than A; in yet another embodiment, to at least one, optionally including more than one, A, and at least one, optionally including more than one, B, and optionally including other elements.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases. The phrase "consisting essentially of," when used in the claims, shall have its ordinary meaning as used in the field of patent law.

What is claimed is:

1. An electrodeionization device comprising:
   a first depleting compartment at least partially defined by a first cation-selective membrane and a first anion-selective membrane;
   a second depleting compartment at least partially defined by a second cation-selective membrane and a second anion-selective membrane;
   a first concentrating compartment disposed between the first and second depleting compartments, the first concentrating compartment at least partially defined by the first cation-selective membrane and the second anion-selective membrane;
   a first source of an aqueous solution comprising a first cation and a first anion fluidly connected upstream to the first depleting compartment; and
   a second source of a salt solution comprising a second cation and a second anion fluidly connected upstream to the second depleting compartment.

2. The device of claim 1, wherein the salt solution comprises sodium ions and chloride ions.

3. The device of claim 1, further comprising a second concentrating compartment in ionic communication with the second depleting compartment, the second concentrating compartment at least partially defined by the second cation-selective membrane.

4. An electrically-driven separation apparatus comprising:
   a first concentrating compartment at least partially defined by a first anion-selective membrane and a first cation-selective membrane;
   a first depleting compartment disposed adjacent the first concentrating compartment and fluidly connected downstream from a first source of a first aqueous solution comprising a first cation and a first anion, the first depleting compartment at least partially defined by the first cation-selective membrane and a second anion-selective membrane, and fluidly connected upstream to the first concentrating compartment;
   a second concentrating compartment at least partially defined by the second anion-selective membrane and a second cation-selective membrane, the second concentrating compartment fluidly connected to a second source of a second aqueous solution; and
   a second depleting compartment disposed adjacent the first concentrating compartment and fluidly connected downstream from the first depleting compartment, the second depleting compartment at least partially defined by the first anion-selective membrane.

5. The apparatus of claim 4, further comprising a cathode compartment fluidly connected to a source of water having a pH of less than 7 pH units.

6. The apparatus of claim 4, wherein the first source of the first aqueous solution comprises a pretreatment device fluidly connected upstream of the first depleting compartment.

7. The apparatus of claim 4, wherein the first cation is an alkali earth ion.

8. The apparatus of claim 7, wherein the first anion is an ion selected from the group consisting of bicarbonates, carbonates, silicates, and sulfates.

9. The apparatus of claim 8, wherein the second concentrating compartment contains an aqueous solution having a pH of less than 7 pH units.

10. The apparatus of claim 9, wherein the first concentrating compartment contains an aqueous solution having a pH of greater than 7 pH units.

11. The apparatus of claim 4, wherein the first concentrating compartment is fluidly connected to a source of treated water.

12. The apparatus of claim 11, wherein the source of treated water comprises an outlet stream from the first depleting compartment.

13. The apparatus of claim 11, wherein the treated water has a resistivity of greater than 5 megohm-cm.

* * * * *